United States Patent
Franck

(10) Patent No.: US 12,062,972 B2
(45) Date of Patent: Aug. 13, 2024

(54) COOLING DEVICE, MOTOR HOUSING AND MOTOR UNIT

(71) Applicant: JHEECO E-DRIVE AG, Eschen (LI)

(72) Inventor: René Franck, Sevelen (CH)

(73) Assignee: JHEECO E-DRIVE AG, Eschen (LI)

( * ) Notice: Subject to any disclaimer, the term of this patent is extended or adjusted under 35 U.S.C. 154(b) by 813 days.

(21) Appl. No.: 17/272,303

(22) PCT Filed: Aug. 23, 2019

(86) PCT No.: PCT/EP2019/072539
§ 371 (c)(1),
(2) Date: Feb. 27, 2021

(87) PCT Pub. No.: WO2020/043602
PCT Pub. Date: Mar. 5, 2020

(65) Prior Publication Data
US 2021/0313862 A1    Oct. 7, 2021

(30) Foreign Application Priority Data

Aug. 30, 2018  (DE) .......................... 102018121203.8

(51) Int. Cl.
*H02K 9/197*  (2006.01)
*H02K 5/20*  (2006.01)

(52) U.S. Cl.
CPC ............ *H02K 9/197* (2013.01); *H02K 5/203* (2021.01)

(58) Field of Classification Search
CPC .......... H02K 5/203; H02K 5/20; H02K 9/197; H02K 9/20; H02K 9/22; H02K 9/225; H02K 9/28; H02K 9/19; H02K 9/193
See application file for complete search history.

(56) References Cited

U.S. PATENT DOCUMENTS

| 4,908,347 A * | 3/1990 | Denk ..................... H02K 11/00 505/211 |
| 2002/0077209 A1* | 6/2002 | El-Antably ......... F16H 57/0412 903/910 |

(Continued)

FOREIGN PATENT DOCUMENTS

| DE | 20216113 U1 | 3/2004 |
| DE | 102010007636 A1 | 8/2011 |

(Continued)

OTHER PUBLICATIONS

English translation (Year: 2024).*

*Primary Examiner* — Nguyen Tran
(74) *Attorney, Agent, or Firm* — Calfee, Halter & Griswold LLP

(57) ABSTRACT

The invention relates to a cooling device with at least one first cooling duct element comprising at least one first cooling duct, and at least one second cooling duct element comprising at least one second cooling duct, where the first and the second cooling duct element each have a circular arc-shaped basic shape around a central axis of the cooling device. The first cooling duct element and the second cooling duct element are arranged concentrically to one another, where the second cooling duct element is arranged with respect to the first cooling duct element in such a way relative to the central axis that the first and the second cooling duct overlie each other along the first and the second cooling duct element at least in part in the radial direction. The invention further relates to a motor housing and a motor unit.

17 Claims, 7 Drawing Sheets

(56) References Cited

U.S. PATENT DOCUMENTS

| | | | |
|---|---|---|---|
| 2008/0085206 A1* | 4/2008 | Kumakura | F04C 29/023 418/200 |
| 2013/0126144 A1 | 5/2013 | Sheu et al. | |
| 2017/0012504 A1 | 1/2017 | Sever | |

FOREIGN PATENT DOCUMENTS

| | | | |
|---|---|---|---|
| DE | 102012017293 | A1 | 2/2014 |
| DE | 102012217361 | A1 | 4/2014 |
| DE | 102014209176 | A1 | 11/2015 |
| DE | 102016104858 | A1 | 9/2017 |
| DE | 102016110658 | A1 | 12/2017 |
| DE | 102016225342 | A1 | 6/2018 |
| DE | 102017112835 | A1 | 12/2018 |
| JP | 2007181182 | A | 7/2007 |

\* cited by examiner

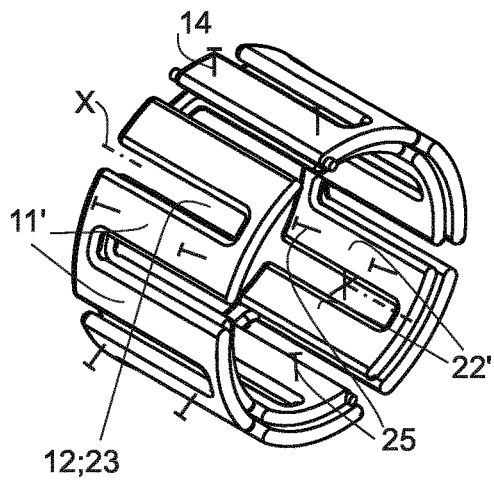 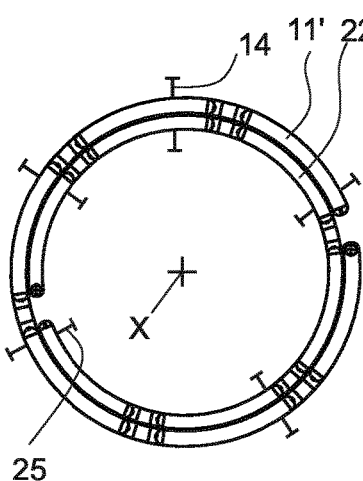 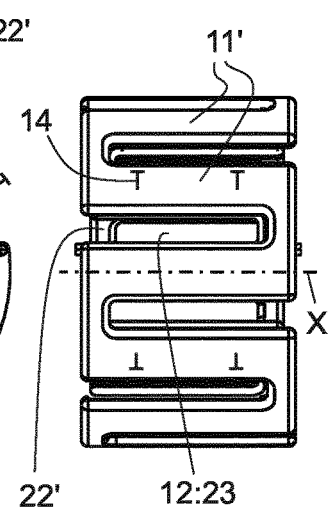
Fig. 14a     Fig. 14b     Fig. 14c
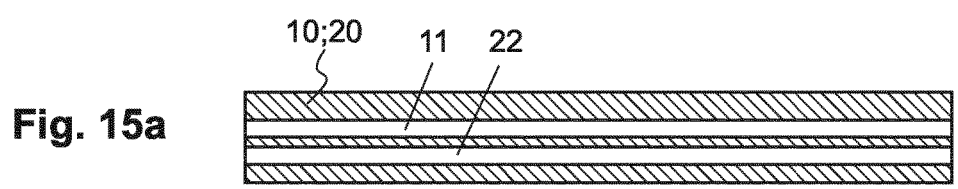
Fig. 15a
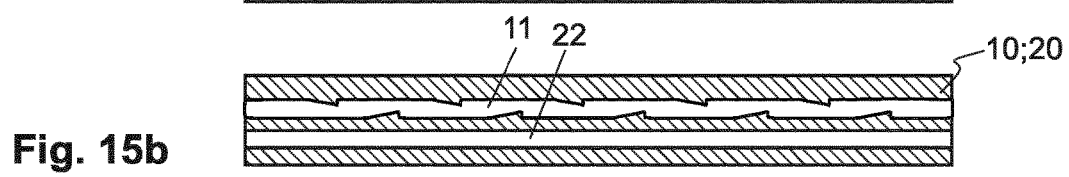
Fig. 15b
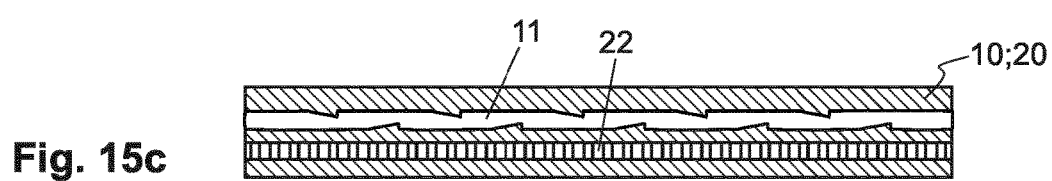
Fig. 15c
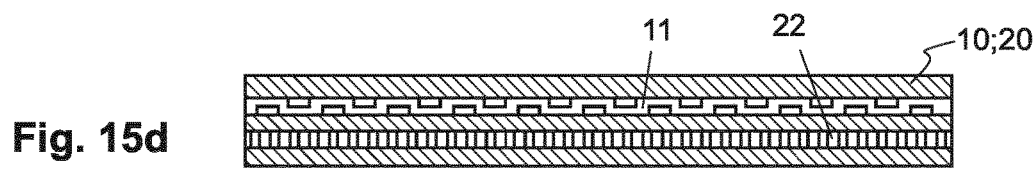
Fig. 15d

COOLING DEVICE, MOTOR HOUSING AND MOTOR UNIT

CROSS-REFERENCE TO RELATED APPLICATIONS

This application is a 371 of PCT Application No. PCT/EP2019/072539, filed on Aug. 23, 2019, which claims priority to German Application No. 10 2018 121 203.8 filed on Aug. 30, 2018, the contents of which are hereby incorporated by reference as if recited in their entirety.

DESCRIPTION

The invention relates to a cooling device with at least one first cooling duct element comprising at least one first cooling duct, and with at least one second cooling duct element comprising at least one second cooling duct. The invention further relates to a motor housing and a motor unit.

Waste heat must be dissipated in particular in electric drive units. The primary heat sources in an integrated electric drive unit are considered to be a battery, a stator winding, a rotor, a transmission, a bearing, and power modules in the inverter of the drive unit. The inverter unit and the stator housing (cooling jacket) are typically cooled with water, where the rotor is cooled by way of a rotor hollow shaft cooling system. The coil end can additionally be cooled for a greater degree of efficiency. This can be done, inter alia, with dielectric oil which is passed through e.g. cooling caps.

Such systems comprise two separate cooling circuits. The first cooling circuit is cooled by way of the vehicle radiator. In contrast, the dissipation of heat from the second cooling circuit is particularly problematic. For this purpose, the use of separate heat exchangers is known from prior art, which are attached, for example, to the motor housing. Such a system is described, for example, by publication JP 2007 181 282.

The disadvantage of separate heat exchangers is the large amount of space they require. It has therefore already been proposed in isolated cases to integrate heat exchangers into the motor housing or into the transmission housing. Such a configuration is shown in publication DE 10 2012 217 361 A1 with a stator housing which has an externally attached double-threaded "worm" for forming cooling ducts.

The disadvantage of this solution is the small contact area between the first cooling circuit and the second cooling circuit, as a result of which heat transfer is limited. Another disadvantage in the context of maximum heat transfer is the small surface area between the colder cooling duct system and the outer stator wall. A further disadvantage is that the helical ducts can only be modified to a limited extent. The separate cooling ducts must run substantially parallel over the entire surface of the stator housing.

The invention is based on the object of providing a cooling device which exhibits improved efficiency, is simple and inexpensive to manufacture, and can be flexibly and easily adapted to different ancillary conditions. The invention is also based on the object of providing a motor housing and a motor unit.

According to the invention, this object is satisfied by a cooling device having the features of claim 1. With regard to the motor housing, the object is satisfied by the object of claim 7 and with regard to the motor unit by the object of claim 9. Preferred embodiments are respectively specified in the dependent claims.

Specifically, the object is satisfied by a cooling device with at least one first cooling duct element comprising at least one first cooling duct, and with at least one second cooling duct element comprising at least one second cooling duct, where the first and the second cooling duct elements each have a circular arc-shaped basic shape around a central axis of the cooling device. The first cooling duct element and the second cooling duct element are arranged concentrically to one another, where the second cooling duct element is arranged with respect to the first cooling duct element in such a way relative to the central axis that the first and the second cooling duct overlie each other along the first and second cooling duct element at least in part in the radial direction.

The invention is based on the basic idea of configuring the cooling device by way of two cooling ducts that are spatially separated from one another in such a way that the cooling ducts can be configured or modified independently of one another and yet overlie each other at least in part in order to ensure advantageous heat transfer between the cooling ducts.

It is provided according to the invention that the first and the second cooling duct elements each have a circular arc-shaped basic shape around a central axis of the cooling device. The cooling duct elements can each extend over a segment of a circle or a full circle, so that the cooling ducts are preferably arranged over a substantial portion around the central axis. In particular, the cooling duct elements or cooling ducts, respectively, are arranged around the central axis in such a way that efficient advantageous cooling can be achieved in the context of a drive unit, in particular of an electric motor.

The efficiency of the cooling device according to the invention can be based, inter alia, on the required installation space, the required cooling fluid volume, the maximum thermal energy that can be dissipated, a quotient of thermal energy and the required cooling fluid volume, or comparable parameters that characterize the cooling device in its function.

The first cooling duct and the second cooling duct can be provided for conveying or forwarding common cooling fluid, identical cooling fluid in separate fluid circuits, or for conveying different cooling fluids in separate fluid or cooling circuits, respectively. In particular, water and/or oil can be provided as cooling fluids. The oil circuit can preferably be formed with the second cooling duct and the water circuit preferably with the first cooling duct.

Furthermore, it is provided that the first cooling duct element and the second cooling duct element are arranged concentrically to one another. The first and the second cooling duct overlie each other at least in part in the radial direction along the first and the second cooling duct element. It is provided that the first and the second cooling duct are configured to be spatially separated from one another.

In particular, the cooling ducts or cooling duct elements, respectively, can be configured offset from one another in the radial direction. The second cooling duct or the second cooling duct element, respectively, is preferably arranged disposed radially on the inside, where the second cooling duct or the second cooling duct element, respectively, is provided disposed radially on the outside. An overlap of the cooling ducts at least in part in the radial direction can thus be provided, where the cooling ducts are configured to be space-saving and independent of one another.

The cooling ducts can be adapted independently of one another and in a flexible manner to specific ancillary conditions of the cooling device, where it is possible to provide efficient heat transfer in a small installation space due to the overlap in the radial 'direction.

It is provided according to a preferred embodiment that the first cooling duct element can be provided as a sleeve part or as a cast part and the second cooling duct element can be provided as a cast part or as a sleeve part, or the first cooling duct element and the second cooling duct element can be provided as a common cast part.

The cast part can be manufactured, for example, from plastic material or metal, in particular in a sand casting or injection-molding process. The sleeve part can also be made of a material, such plastic material or metal, which is advantageously selected in accordance with the technical ancillary conditions.

The first and the second cooling duct elements can alternatingly be configured as a cast part or as a sleeve part. It is provided that the respective sleeve part can be slipped onto the respective cast part in order to form the overlap of the cooling ducts in the radial direction. A modular combination of the first and the second cooling duct that can be configured in a variable manner and is easy to produce is available.

Furthermore, the first and the second cooling duct elements can be configured as an integrally formed cast part. In this sense, the first and the second cooling duct are integrated according to the invention in the integrally formed cast part which embodies the first and the second cooling duct element. The first and the second cooling duct overlap each other at least in part in the radial direction within the integrally formed cast part. A freely variable integral configuration of the first and the second cooling duct is available.

It is provided in a further embodiment that the first cooling duct has a helix structure, a net structure, a meander structure or a mixed form, and the second cooling duct has a helix structure, a net structure, a meander structure, or a mixed form.

In this sense, a flexible, freely variable, individual and mutually independent configuration of the first and the second cooling duct can be realized. The basis for the configuration of the cooling ducts is to be able to provide an advantageous cooling effect as efficient as possible along the circumference around the central axis of the cooling device. The efficiency of the cooling device can be increased, for example, by increasing the surface area between the first and the second cooling duct that is active for heat exchange. It is also conceivable that the provision of a cooling effect on the basis of the first and the second cooling duct element or the cooling ducts, respectively, is restricted to a specific section of a circle around the central axis of the cooling device in dependence of the position of specific heat sources, such as a coil end or a stator winding, respectively.

According to one embodiment, the first cooling duct and the second cooling duct each have a meander structure, where first separation gaps between meander structures of the first cooling duct of the first cooling duct element are provided rotated about the central axis of the cooling device in relation to second separation gaps between meander structures of the second cooling duct of the second cooling duct element.

The geometric configuration of the cooling duct elements can be provided to correspond to the respective meander-shaped configuration of the cooling ducts. The first and/or the second cooling duct element can accordingly themselves have meander-shaped geometries and separation gaps between individual meanders. Within the cooling device, the meander-shaped structures of the first and the second cooling duct element, in particular the separation gaps of the meander structures, can be arranged rotated relative to one another. In this way, facilitated positioning can be achieved and a thinner partition wall between the first and the second cooling duct element can be obtained in the course of a casting process for producing the first and the second cooling duct element.

According to a further embodiment, the circular arc-shaped basic shape of the first cooling duct element and/or the second cooling duct element extends over 360 degrees around the central axis of the cooling device or over less than 360 degrees around the central axis of the cooling device, in particular over 270 degrees, 180 degrees, 135 degrees, 120 Degrees or 90 degrees around the central axis of the cooling device.

The first and the second cooling duct element can, as required, be formed along the circumference around the central axis of the cooling device. In particular, the cooling duct elements can also extend only along an in particular thermally significant region around the central axis of the cooling device in order to provide an adequate cooling effect.

In addition, the first and the second cooling duct element can extend over circular sections of different sizes around the central axis of the cooling device. In this way, the cooling device can be configured advantageously, efficiently and individually depending on the specific application.

According to one embodiment, the first cooling duct and/or the second cooling duct has a smooth inner side and/or a structured surface with serrated structures, stepped structures, columnar structures, and/or slug-shaped structures. The structures can be configured as blunt (e.g. square-shaped inflow cross-section) and/or as slim members (e.g. teardrop-shaped inflow cross-section).

The first and the second cooling duct can each have an arbitrarily configurable and varying surface structure along their inner side in order to provide an increase in surface area within the cooling ducts and therefore optimized heat transfer and improved fluid mixing. Accordingly, the configuration of the cooling ducts can take place individually in dependence of the specific application conditions of the cooling device according to the invention.

In a secondary aspect of the present invention, a motor housing with a cooling device according to the invention is provided.

The individually and advantageously configurable cooling device with the first and the second cooling duct element can then be used in connection with the motor housing and/or be integrated into the motor housing. The cooling device can possibly also be positioned on the motor housing to interact with other components, such as an inverter unit or inverter cooling, respectively. Depending on the specific application of the motor housing and the specific conditions of use, an advantageous cooling effect can be provided by way of the motor housing.

According to one embodiment, at least one additional cooling duct is integrally formed in the motor housing. The cooling device preferably is or can be in flow communication with the additional cooling duct. A cooling fluid or a fluid from a cooling circuit of the cooling device can also be used for cooling further components in or on the motor housing, respectively.

In particular, the cooling device can be provided integrated into the motor housing in such a way that the cooling device completes and fluidly closes an integral cooling circuit of the motor housing. Efficient and advantageous use of the cooling fluid can then be ensured.

In a further aspect of the invention, a motor unit, in particular an electric motor, is provided with a cooling device according to the invention or a motor housing according to the invention.

According thereto, a complete motor unit with an advantageous cooling effect can be provided. The cooling device according to the invention can preferably be intended to provide a cooling effect at the electric motor.

In one embodiment, at least one further cooling structure, in particular an inverter cooling, a transmission cooling, a coil end cooling and/or a rotor hollow shaft cooling, is provided in addition to the cooling device in the motor housing. A cooling circuit can be closed within the motor housing by way of the cooling device.

The at least one cooling fluid can advantageously be forwarded in an expedient manner for cooling several components. Efficient usage of the cooling fluid for providing a suitable cooling effect along the various components of the motor unit can be ensured.

According to a preferred embodiment, at least one first and/or second cooling fluid can be forwarded in series via the cooling device to the further cooling structure or a parallel connection of the cooling device to the at least one further cooling structure is provided.

Accordingly, a cooling circuit can be formed within the motor unit which provides a serial supply or a parallel supply to the various components using a first and/or a second cooling fluid. Since the cooling fluid is forwarded to the various components in series, i.e. one after the other, the amount of cooling fluid required can in particular be reduced. By using a parallel connection of the cooling structures or cooling paths, in particular, an optimized cooling effect per unit volume of the cooling fluid can be achieved. It is also conceivable that the entire cooling circuit of the motor unit or within the motor housing is configured in part as a serial cooling circuit and in part as a parallel cooling circuit. Various components can then be supplied with cooling fluid consecutively and other components can in turn be arranged relative to each other or be supplied with cooling fluid in the form of a parallel connection.

The invention shall be explained in more detail below using the embodiments with reference to the accompanying schematic drawings providing further details, where:

FIG. 14a-c shows different views of the casting cores for producing a further embodiment of the cooling device according to the invention; and FIGS. 15a-d show different surface configurations of a first and/or a second cooling duct.

Figure 1:
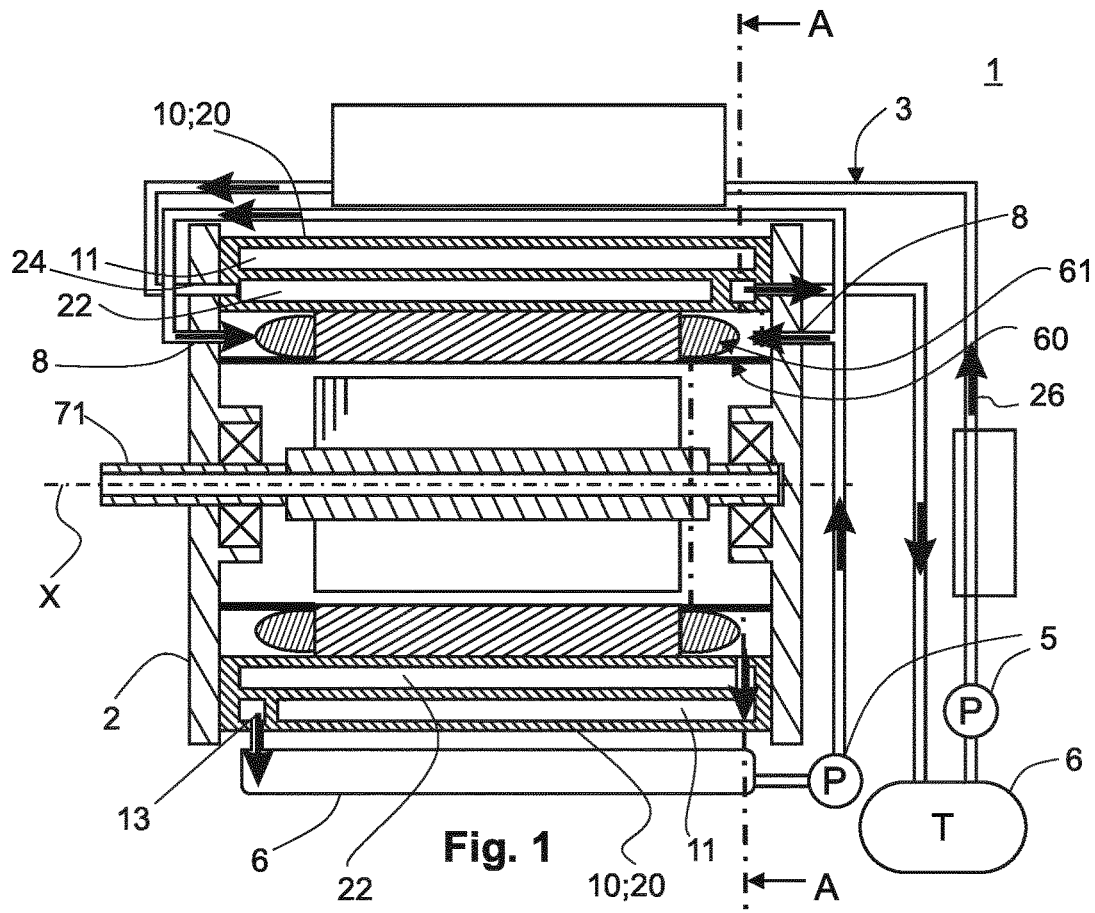
FIG. 1 shows a schematic sectional view of a first embodiment of a motor unit according to the invention.

FIG. 1 shows a schematic sectional view of a first embodiment of a motor unit 1 according to the invention.

Motor unit 1 comprises a motor housing 2 and a cooling device 3 which is in flow communication via fluid lines with at least one pump unit 5 and at least one tank unit 6. In the arrangement according to FIG. 1, two pump units 5 and two tank units 6 are provided in an expedient form for providing a sufficient flow of cooling fluid, in particular for conveying and storing a first cooling fluid 16 and a second cooling fluid 26 in separate cooling fluid circuits.

A first cooling duct element 10 and a second cooling duct element 20 are arranged in motor housing 2. In particular, first and second cooling duct element 10; 20 according to FIG. 1 are integrally formed.

Provided in an inner diameter of second cooling duct element 20 is a stator or coil end 61 and a rotor on a rotor shaft 71 to form an electric motor. Cooling duct elements 10; 20 are formed with coil end 61, the rotor, and rotor shaft 71 in a manner that is concentric relative to a central axis X of cooling device 3 or housing 2, respectively.

Furthermore, coil end 61 is spatially delimited from the rotor or rotor shaft 71, respectively, in order to form a coil end cooling 60. Housing 2 comprises several fluid ports or housing ports 8, respectively, in flow communication with the further fluid lines in order to provide a supply and discharge for first cooling fluid 16, inter alia, to coil end cooling 61.

According to FIG. 1, first and second fluid ducts 11; 22 are formed in integrally formed first and second cooling duct elements 10; 20. First cooling fluid 16 can be circulated via first fluid ports 13 through first cooling duct 11. Second cooling fluid 26 can be circulated via second fluid ports 24 through second cooling duct 22.

According to FIG. 1, first cooling duct 11 is short-circuited to coil end cooling 60 in terms of flow communication so that first cooling fluid 16 can be discharged from coil end cooling 60 via first cooling duct 13 and first fluid port 13.

In the context of the present invention, the supply and discharge of cooling fluid is always to be understood in relation to the conveying direction of the respective cooling fluid and can essentially also be provided in a reverse direction. Furthermore, several first and second fluid ports 13; 24 or housing ports 8, respectively, can be provided in order to provide appropriate circulation of respective cooling fluid 16; 26. The preferred conveying directions are shown in FIG. 1 as well as in the subsequent figures with the aid of arrows.

Furthermore, first and second cooling fluid 16; 26 in first and second cooling duct 11; 22 or coil end cooling 60, respectively, can be identical or differ from one another. In particular, first and second cooling duct 11; 22 can be configured as water or oil circuits. Radially inner second cooling duct 22 is preferably filled with oil as second cooling fluid 26, where radially outer first cooling duct 11 is filled with water as first cooling fluid 16. The designations as first cooling fluid 16 and second cooling fluid 26 can each refer to first and second cooling duct 11; 22.

Integrally formed first and second cooling duct elements 10; 20 comprise first fluid ports 13 for flow communication with first cooling duct 11, and second fluid ports 24 for flow communication with second cooling duct 22, in particular with external fluid lines. Separate or identical cooling fluids 16; 26 can be circulated through first and second cooling duct 11; 22

Figure 2:
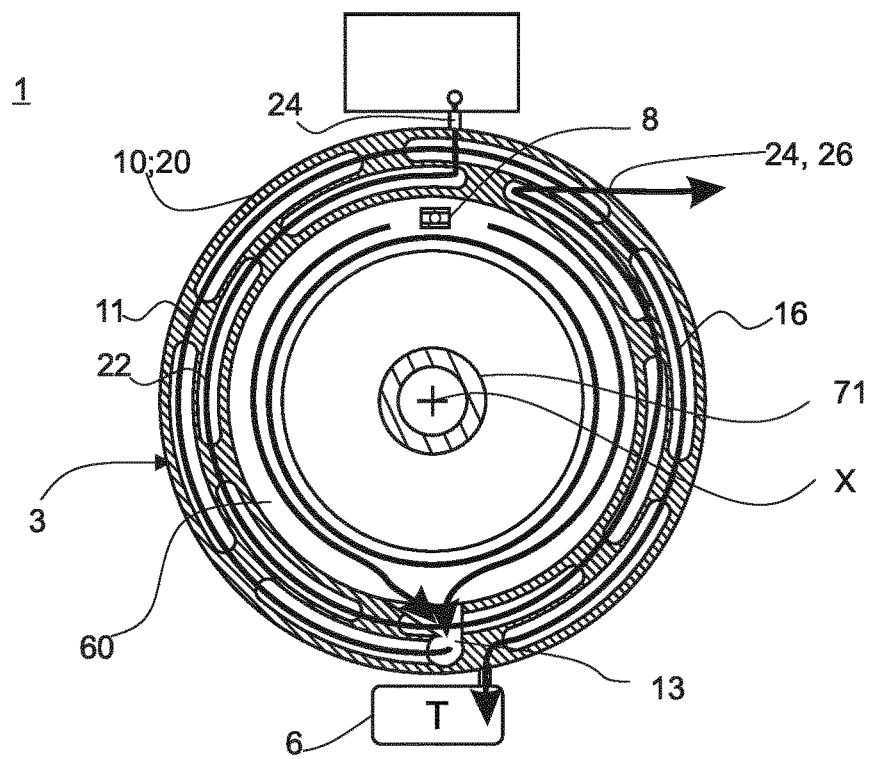
FIG. 2 shows a sectional view A-A of the first embodiment of a motor unit according to the invention according to FIG. 1.

FIG. 2 shows a sectional view A-A of the first embodiment of a motor unit 1 according to the invention according to FIG. 1;

According to FIG. 2, second cooling fluid 26 enters second fluid duct 22 via one of second fluid ports 24, circulates in second fluid duct 22 over a circular segment of almost 360 degrees about central axis X of cooling device 3 and again exits via a further second fluid port 24 from second cooling duct 22.

Furthermore, first cooling fluid 16 for first cooling duct 11 is introduced directly into coil end cooling 60 via a housing port 8. After passing through coil end cooling 60, the cooling fluid enters first cooling duct 11 by way of a short circuit in the flow communication. After the cooling fluid has flowed through first cooling duct 11 over almost 360 degrees around central axis X, it exits from first cooling duct 11 via a further first fluid port 13 and enters associated tank 6.

The embodiment according to FIG. 2 therefore represents a serial supply of cooling fluid to coil end cooling 60 and first fluid duct 11. Furthermore, there is an overlay of first and second cooling duct 11; 22 at least in part in the radial direction so that advantageous heat exchange between first and second cooling fluid 16; 26 in first and the second cooling duct 11; 22 can take place.

Figure 3:
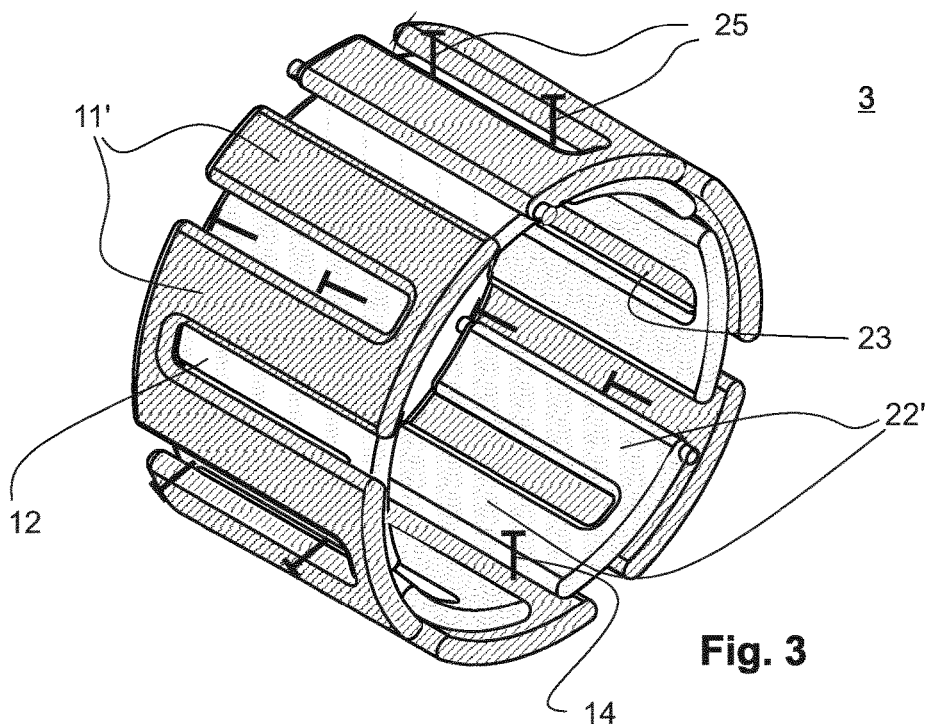
FIG. 3 shows a perspective view of cast cores for producing a cooling device according to the invention according to the first embodiment.

FIG. 3 shows a perspective view of first and second cast cores 11'; 22' for producing a cooling device 3 of the invention according to the first embodiment of FIGS. 1 and 2.

First and second casting cores or sand cores 11'; 22', respectively, are a representation of first and second fluid ducts 11; 22. In this sense, it is provided that first and second cooling duct element 10; 20 can be produced as a single cast part in a sand-casting process.

During the production of the cast part, sand cores 11'; 22' shown in FIG. 3 are used to form first and second fluid duct 11; 22. In this sense, first and second cast core 11'; 22' according to the first embodiment each have a meander-like shape. First and second separation gaps 12; 23 between the individual meanders are rotated against each other in a rotatory manner.

For forming first fluid duct 11, outer first cast core or sand core 11', respectively, comprises radially inner first slug elements 14 which extend through second separation gaps 23. Outer cast core 11' is supported inwardly by way of first slug elements 14. Inner second casting core 22' comprises radially outer second slug elements 25 which extend through first separation gaps 12. Inner cast core 22' is supported outwardly. Due to first and second slug elements 14; 25, a shift of cast cores 11'; 22' is minimized during the casting process. Accurate reproduction of cores 11'; 22', preferably configured as sand cores 11'; 22', is possible in one casting process.

Figure 4:
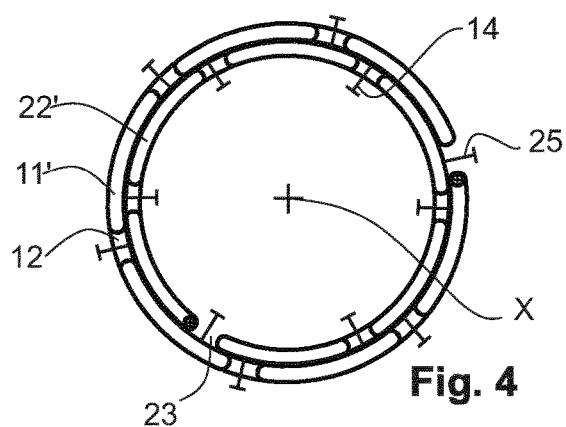
FIG. 4 shows a top view of the casting cores for producing a cooling device of the invention according to the first embodiment according to FIG. 3.
Figure 5:
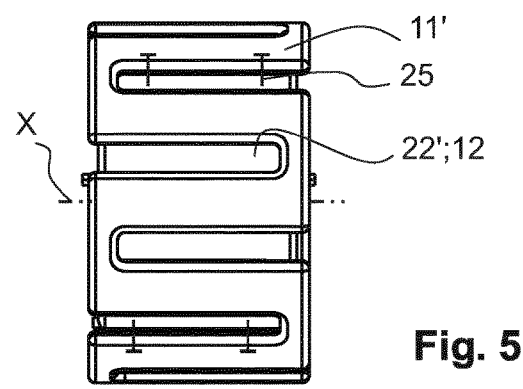
FIG. 5 shows a side view of the cast cores for producing a cooling device of the invention according to the first embodiment according to FIG. 3.

FIGS. 4 and 5 show a top view and a side view of casting cores 11'; 22' for producing a cooling device 3 of the invention according to the first embodiment according to FIG. 3.

It can be seen in FIGS. 4 and 5 that first and second separation gaps 12; 23 of first and second mold cores 11'; 22' are arranged rotatorily offset There is a partial overlay in the radial direction of cast cores 11'; 22' and therefore of first and second fluid ducts 11; 22 created therefrom.

First slug elements 14 of first casting core 11' are facing radially inwardly, where second slug elements 25 of second casting core 22' are facing radially outwardly in order to exercise a support function during the casting process for producing the first and the second cooling duct element.

Figure 6:
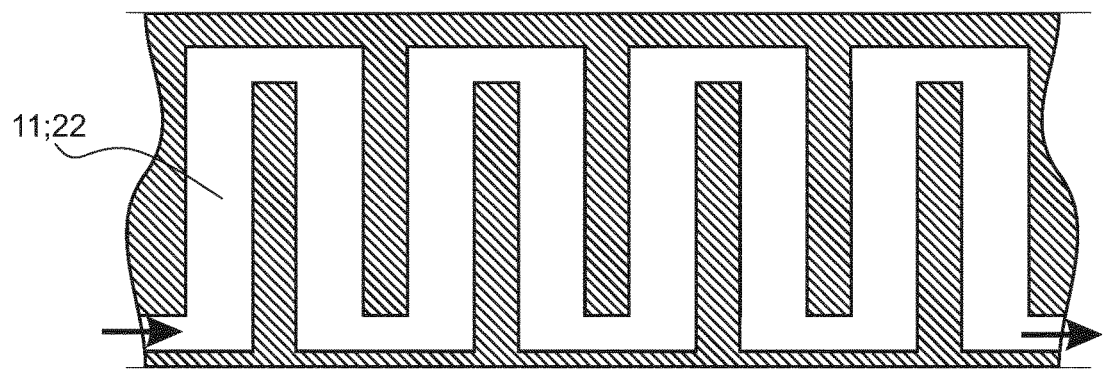
FIG. 6 shows a schematic representation of a cooling duct run according to the first embodiment of the cooling device according to the invention.

FIG. 6 shows a schematic representation of a cooling duct run according to the first embodiment of cooling device 3 according to the invention;

Shaping first and second cooling duct 11; 22 according to FIG. 6 is effected by using cast cores 11'; 22' from FIGS. 3 to 5. Cooling ducts 11; 22 are formed having a meander shape which comprises alternating ascending and descending flanks. A substantial extension of cooling ducts 11; 22 can be obtained along a section of a circle around central axis X of cooling device 3 due to the meander shape. The heat exchange between cooling fluids 16; 26 in first and second cooling duct 11; 22 is improved in this way.

Figure 7:
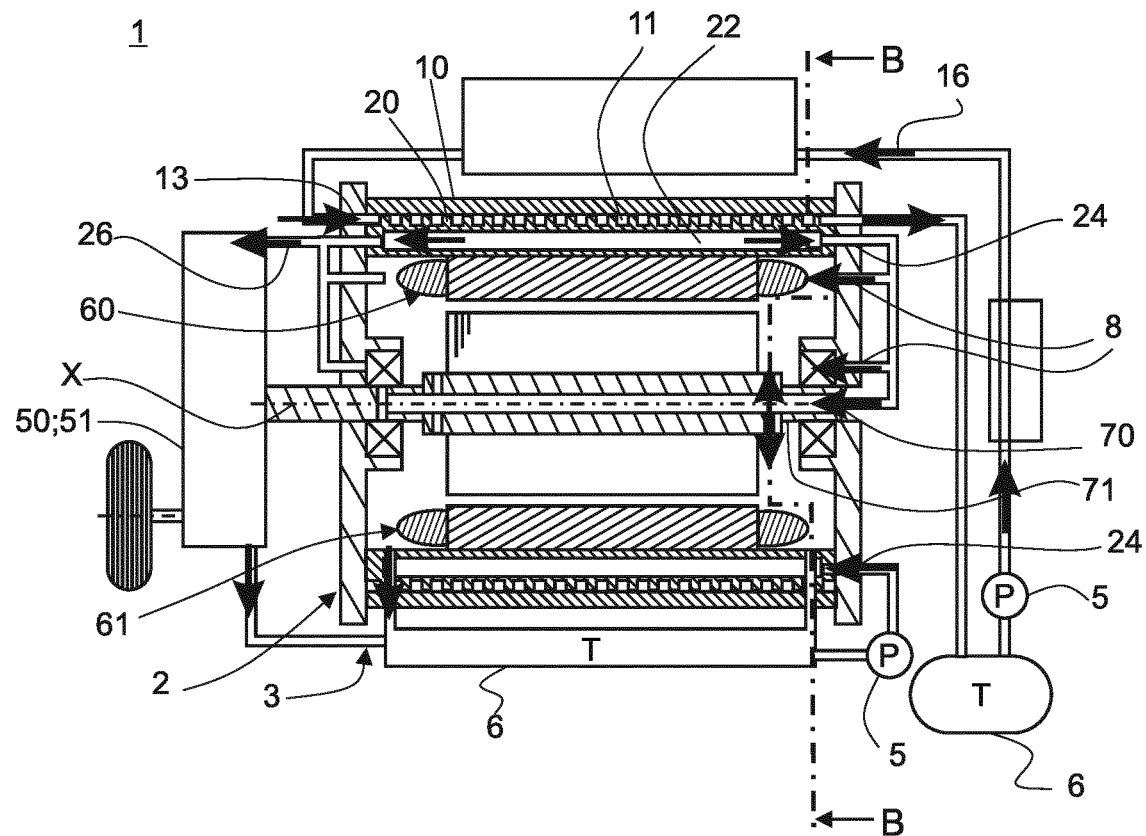
FIG. 7 shows a schematic sectional view of a second embodiment of a motor unit according to the invention.

FIG. 7 shows a schematic sectional view of a second embodiment of motor unit 1 according to the invention;

According to FIG. 7, a parallel connection of the cooling circuit within cooling device 3 is provided for the supply or cooling of coil end cooling 60 for coil end 61, a rotor shaft cooling 70 for rotor shaft 71, and a transmission cooling 50 for a transmission 51. The bearings are also cooled. In particular, second cooling fluid 26 can flow along second fluid ports 24 into second cooling duct 22 and via fluid ports 8 in motor housing 2 up into coil end cooling 60. In this sense, a serial or successive supply of second cooling fluid 26 is formed between the parallel connection and second cooling duct 22.

Second cooling duct 22 can be understood as being a feeder or distributor (cf. arrow representation to indicate the direction of flow in FIG. 7) of the cooling circuit connected in parallel for transmission 51, coil end 61, and rotor shaft 71. Second cooling fluid 26 is supplied along associated tank unit 6 by way of associated pump unit 5 and via second fluid ports 24 into second cooling duct 22.

Furthermore, according to FIG. 7, first and second cooling duct element 10; 20 are formed in several parts. Second cooling duct element 20 has a meander-shaped structure on the inner side for forming second cooling duct 22. A spiral-shaped or thread-shaped structure is embossed or formed on the outer side or an outer circumference of second cooling duct element 20.

First cooling duct element 10 is provided as a sleeve for forming first cooling duct 11 in interaction with second cooling duct element 20. First cooling duct 10 is formed by a combination of second cooling duct element 20 as a cast part and first cooling duct element 10 in the form of an expedient, preferably precisely fitting sleeve on second cooling duct element 20.

Spiral or thread-shaped first cooling duct 11 is supplied via first fluid ports 13 on first and second cooling duct element 10; 20 with first cooling fluid 16 by associated pump 5 and associated tank 6. According to FIG. 7, two tank units 6 and two pump units 5 each form independent separate cooling circuits. First cooling duct 11 can preferably be supplied with first cooling fluid 16, such as water or on a water basis, where oil-like second cooling fluid 26 is used in second cooling duct 22.

Figure 8:
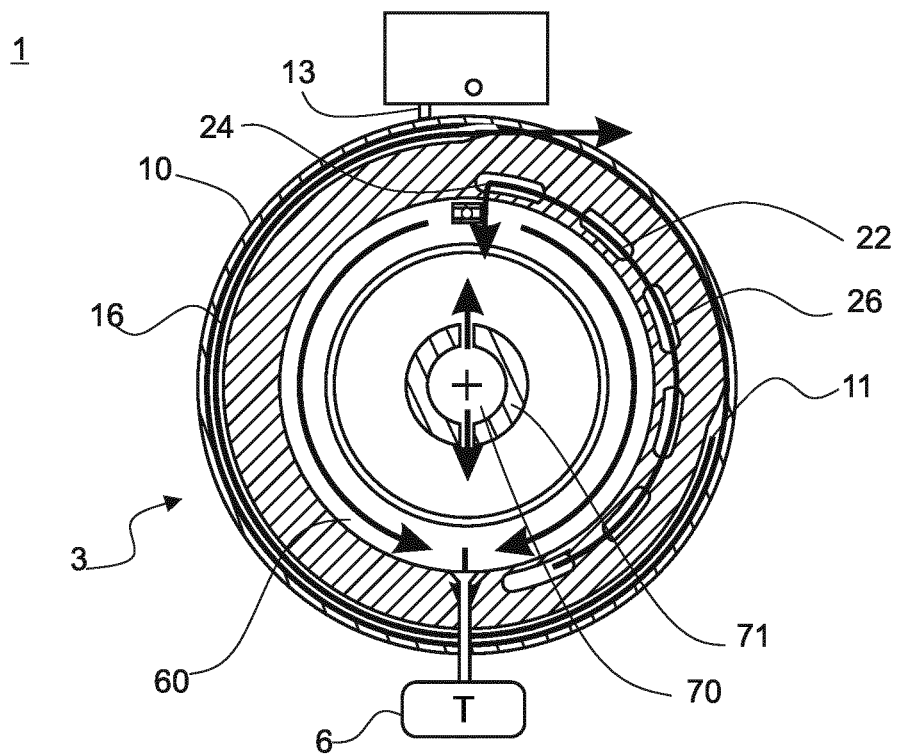
FIG. 8 shows a sectional view B-B of the second embodiment of the motor unit according to the invention according to FIG. 7.

FIG. 8 shows a sectional view B-B of the second embodiment of a motor unit 1 according to the invention according to FIG. 7;

It can be seen in FIG. 8 that first cooling duct 11 is defined radially on the outside by sleeve-shaped first cooling duct element 10. First cooling duct 11 extends several times around the outer circumference of central axis X of cooling device 3. In this sense, first cooling duct 11 extends over 360 degrees around central axis X of cooling device 3.

Second cooling duct 22 extends radially inside relative to first cooling duct 11 and in a meander-like shape, so that first and second cooling duct 11; 22 overlie each other at least in part in the radial direction. Furthermore, FIG. 8 shows the supply of coil end cooling 60 and rotor shaft cooling 70 for rotor shaft 71 with second cooling fluid 26, where second cooling fluid 26 is subsequently returned to associated tank unit 6.

Figure 9:
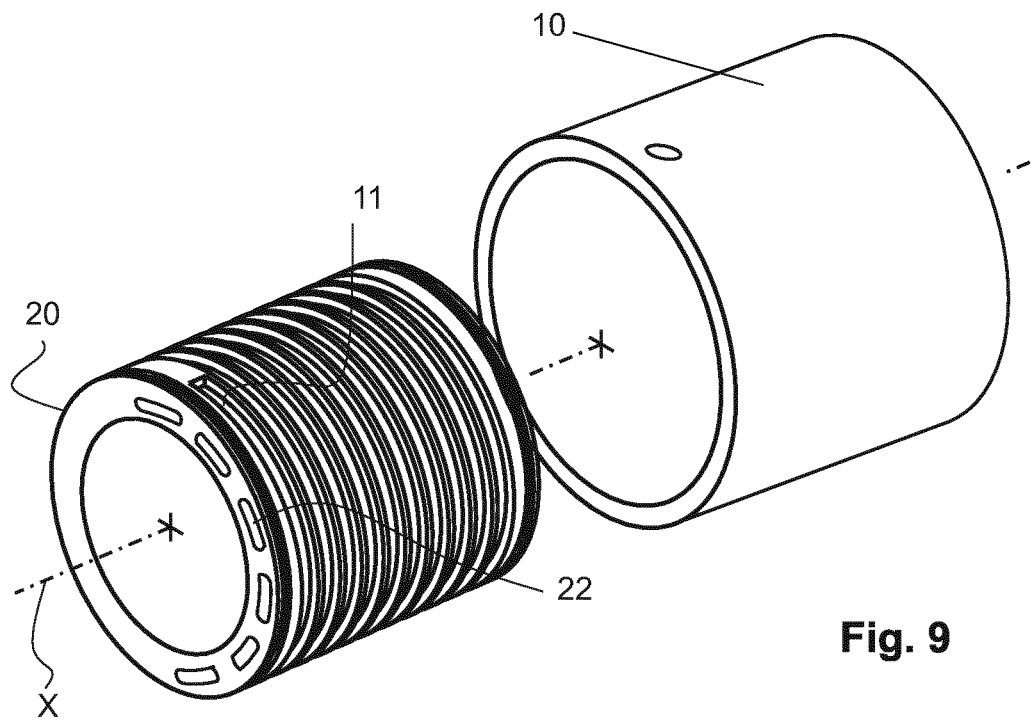
FIG. 9 shows a perspective view of the second embodiment of the cooling device according to the invention.

FIG. 9 shows a perspective view of the second embodiment of cooling device 3 according to the invention;

Sleeve-shaped first cooling duct element 10 can be placed on cast part-shaped second cooling duct element 20 in such a way that thread-shaped first cooling duct 11 is sealed. First cooling duct 11 is formed advantageously by the interaction of first and second cooling duct element 10; 20.

Formed integrally in second cooling duct element 20, configured as a cast part, is second cooling duct 22 (indicated schematically in FIG. 9). In particular, second cooling duct 22 can have a meander-like shape.

Figure 10:
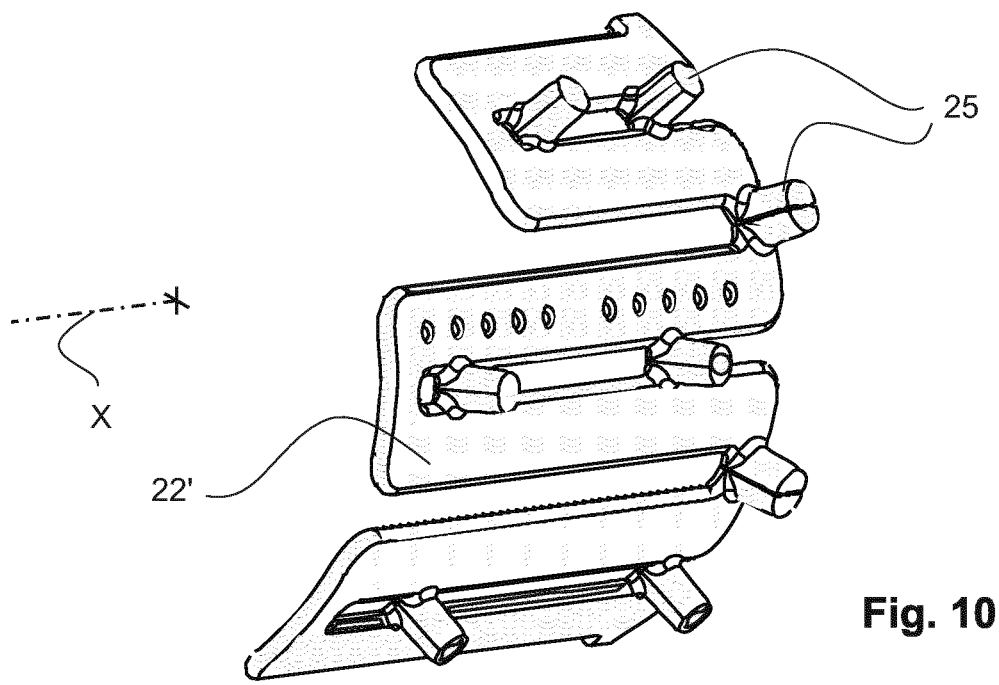
FIG. 10 shows a perspective view of a casting core for producing the second cooling duct element according to the second embodiment according to FIGS. 7 to 9.

FIG. 10 shows a perspective view of second casting core or sand core 22', respectively, for producing second cooling duct element 20 according to the second embodiment according to FIGS. 7 to 9.

By way of second casting core 22', which is preferably configured as a sand core, second cooling duct 22 can be configured as a cast part during the production of second cooling duct element 20. Sand core 22' can in particular be arranged in the casting mold and positioned with the aid of second slug elements 25. Second sand core 22' can thereby be substantially prevented from shifting during the casting process. As a result, second sand core 22' according to FIG. 10 largely represents the longitudinal and meandering geometry of second producible cooling duct 22 in second cooling duct element 20.

Figure 11:
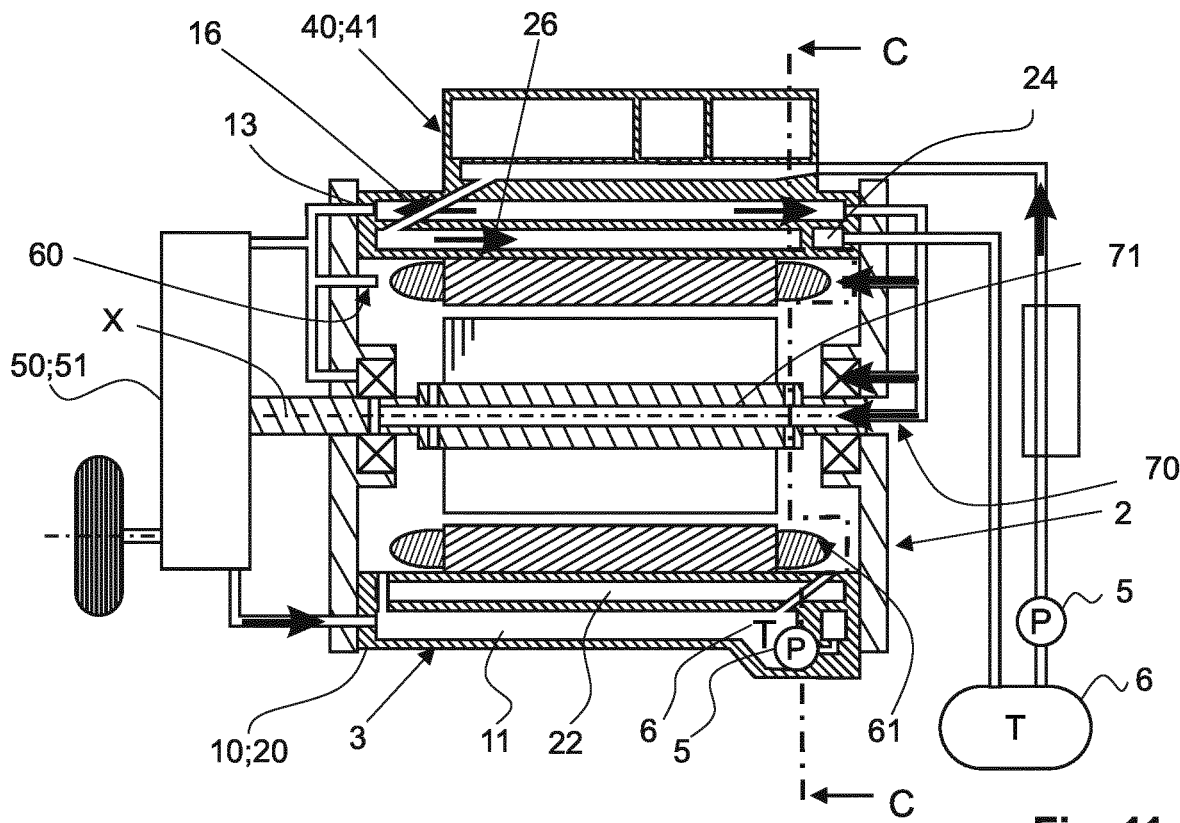
FIG. 11 shows a schematic sectional view of a third embodiment of a motor unit according to the invention.

FIG. 11 shows a schematic sectional view of a third embodiment of motor unit 1 according to the invention;

Provided according to the third embodiment is a series connection of second cooling duct 22 with an inverter cooling system 40 for an inverter unit 41 of motor unit 1. Second cooling fluid 26 is supplied to second cooling duct 22 via second fluid port 24 and forwarded to inverter cooling 40. According to FIG. 11, inverter unit 41 and inverter cooling system 40 can be formed integrally with first and second cooling duct element 10; 20.

First and second cooling duct element 10; 20 according to FIG. 1 are integrally formed. First and second cooling duct 11; 22 preferably each have a meander-shaped run.

Furthermore, a parallel connection of transmission cooling 50 for transmission 51, of coil end cooling 60 for coil end 61, and of rotor shaft cooling 70 for rotor shaft 71 is supplied with first cooling fluid 16 by way of first cooling duct 11. A connection of the individual components in series in part and parallel in part via first or second cooling duct 11; 22, respectively, is therefore given according to the embodiment of FIG. 11.

According to FIG. 11, a pump unit 5 can be integrated directly into first cooling duct 11 of first and second cooling duct element 10; 20. Likewise, an associated tank unit or a compensation tank unit 6 is formed integrated into integrally formed first and second cooling duct element 10; 20.

Figure 12:
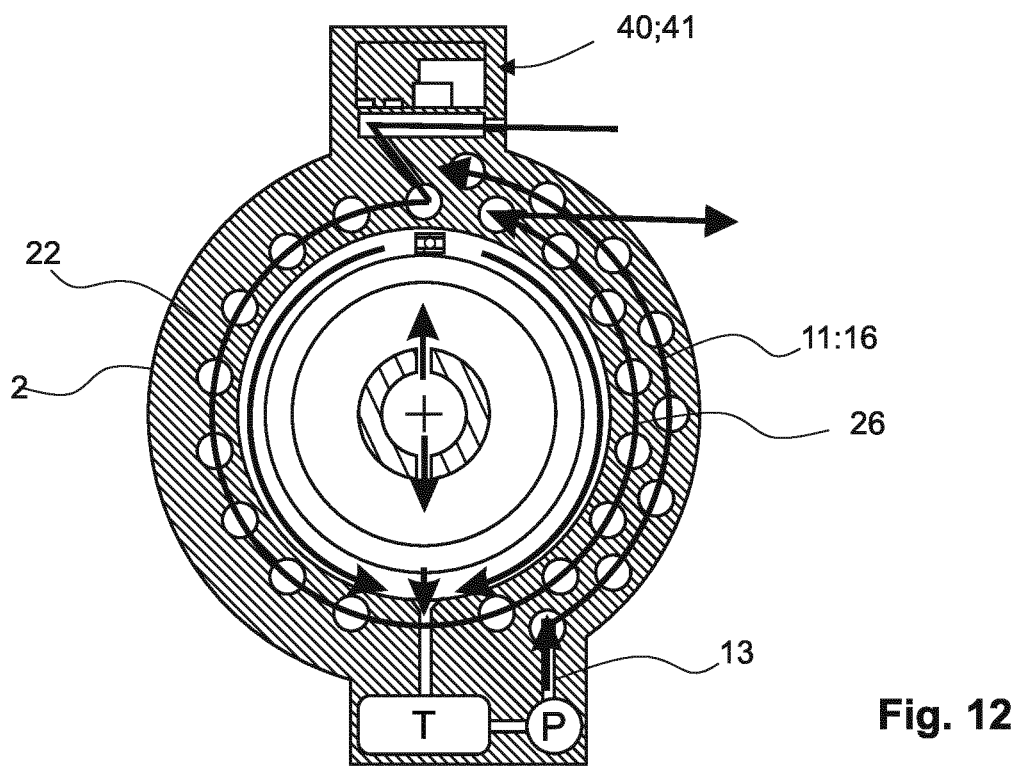
FIG. 12 shows a sectional view C-C of the third embodiment of the motor unit according to the invention according to FIG. 11.

FIG. 12 shows a sectional view C-C of the third embodiment of motor unit 1 according to the invention according to FIG. 11;

According to FIG. 12, inter alia rotor shaft cooling 70 and coil end cooling 60 are supplied with first cooling fluid 16 via first cooling duct 11. A closed cooling circuit is formed in connection with associated tank unit 6 and associated pump unit 5, which are integrated into integrally formed first and second cooling duct element 10; 20.

Furthermore, first cooling duct 11 extends only over a circular angle of approximately 180 degrees around central axis X of cooling device 3.

Second cooling duct 22 extends only over an angle of approximately 360 degrees around central axis X of cooling device 3. Furthermore, second cooling duct 22 with inverter cooling 40 forms a series connection in the cooling circuit. Second cooling duct 22 and inverter cooling 40 are supplied with second cooling fluid 26 by a pump unit 5 and tank unit 6 arranged externally to cooling duct elements 10; 20 and housing 2.

The cooling circuits along first and second cooling duct 11; 22 are formed separately from one another. Furthermore, first and the second cooling duct 11; 22 are each formed meander-like and with a circular cross-section.

Figure 13:
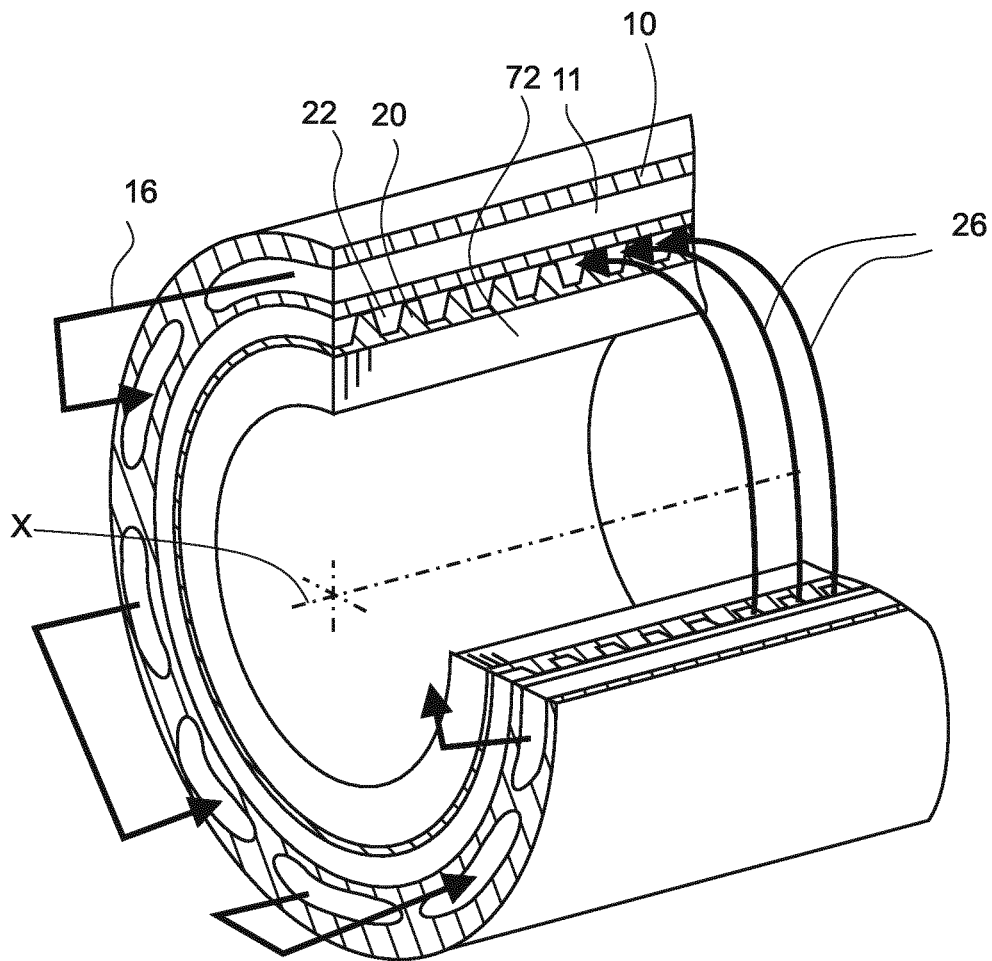
FIG. 13 shows a perspective sectional view of a fourth embodiment of the cooling device according to the invention.

FIG. 13 shows a perspective sectional view of a fourth embodiment of cooling device 3 according to the invention.

According to the fourth exemplary embodiment, first and the second cooling duct element 10; 20 are formed in several parts. First cooling duct element 10 is formed as a cast part and comprises integrally formed, meander-like extending first cooling duct 11. First cooling duct 11 is provided with a longitudinal cross section and forwards first cooling fluid 16.

According to FIG. 13, second cooling duct element 20 is configured as a sleeve comprising a thread-like structure on its outer circumference. A stator laminated sheet package 72 (stator winding and coil end not shown) is arranged on an inner circumference of second cooling duct element 20. Spiral-shaped second cooling duct 22 in combination with first cooling duct element 10 can be formed and sealed advantageously on the basis of second cooling duct element 20 thus configured. Second cooling duct 22 is therefore formed expediently for receiving and forwarding second cooling fluid 26. First and second cooling ducts 11; 22 overlie each other at least in part in the radial direction.

FIGS. 14a to 14c show different views of first and second cast or sand core 11; 22', respectively, for producing a further embodiment of cooling device 3 according to the invention.

To form first and second cooling duct 11; 22, sand cores 11'; 22' are arranged according to FIGS. 14 to 14 c in a cast part relative to one another in such a way that first and second separation gaps 12; 23 are superimposed. Furthermore, first slug elements 14 extend radially outward according to FIGS. 14a to 14c, where second slug elements 25 extend inwardly in the direction of central axis X. Sand cores 11'; 22' are thereby expediently supported in order to ensure that first and second cooling duct 11; 22 to be formed as precisely as possible during the casting process for producing integrally formed first and second cooling duct element 10; 20.

FIGS. 15*a* to 15*d* illustrate different surface configurations or surface structures of first and/or second cooling duct 11; 22. First and second cooling duct element 10; 20 in FIGS. 15*a* to 15*d* are shown by way of example and in a simplified manner as integrally formed and being linear.

First and second cooling ducts 11; 22 can have different and, as required, varying surface structures independently of one another. Furthermore, first and second cooling duct 11; 22 have identical surface structures. The aim of surface structuring can be in particular to optimize the exchange of heat between first and second cooling duct 11; 22 in dependence of the specific application or the specific conditions of use.

According to FIG. 15*a*, first and second cooling duct 11; 22 each have a smooth inner surface. A flow of cooling fluid as uniform as possible along first and second cooling duct 11; 22 is thus enabled.

In FIG. 1*n* FIG. 15*b*, first cooling duct 11 has serrated or hooknose-shaped or stepped structures which can extend alternately on the oppositely disposed wall sides or in a spiral shape along the inner side of first cooling duct 11. For example, improved mixing of the cooling fluid along first cooling duct 11 can then be obtained. Second cooling duct 22 is formed according to FIG. 15*b* with a continuously smooth inner side or surface.

First cooling duct 11 in FIG. 15*c* is provided with a surface structure according to FIG. 15*b*. Second cooling duct 22 comprises columnar wall structures in order to provide suitable flow obstacles. Columnar wall structures can be provided alternatingly on oppositely disposed wall sections. Alternatively, the columnar wall structures can extend in particular in a spiral shape along the inner side of second cooling duct 22.

Second cooling duct 22 in FIG. 15*d* is configured according to the embodiment of FIG. 15*c*. First cooling duct 11 comprises protruding slugs in an alternating shape on oppositely disposed inner surfaces. In this case as well, the slugs can be configured, for example, having a spiral shape along first cooling duct 11.

In summary, a cooling device 3, in particular for a motor housing 2 or a motor unit 1 which can be configured to be flexible and specific to the application in a simple, inexpensive and space-saving manner can be provided with the present invention.

On the basis of the freely selectable individual configuration of first and second cooling duct 11; 22, heat transfers and the cooling effects that can be achieved thereby can be variably adapted. Furthermore, separate cooling circuits can be formed by way of first and second cooling duct 11; 22 which enable the employment of different or identical first and second cooling fluids 16; 26, such as oil or water Furthermore, the parallel connection or series connection to further cooling structures, such as inverter cooling 40, transmission cooling 50, coil end cooling 60 and/or rotor shaft cooling 70 of a motor unit 1 is possible as required for the efficient employment of cooling fluids 16; 26. The optimization of a cooling strategy for entire motor unit 1 by way of cooling device 3 according to the invention is thus made possible.

LIST OF REFERENCE CHARACTERS

1 motor unit
2 motor housing
3 cooling device
5 pump unit
6 tank unit
8 housing connections
10 first cooling duct element
11 first cooling duct
11' first/outer (sand) casting core
12 first separation gap
13 first fluid ports
14 first slug elements
16 first cooling fluid
20 second cooling duct element
22' second/inner (sand) casting core
23 second separation gap
24 second fluid ports
25 second slug elements
26 second cooling fluid
40 inverter cooling
41 inverter unit
50 transmission cooling
51 transmission
60 coil end cooling
61 coil end
70 rotor shaft cooling
71 rotor shaft
72 stator laminated sheet package
X central axis of the cooling device

The invention claimed is:

1. A cooling device with at least one first cooling duct element comprising at least one first cooling duct, and at least one second cooling duct element comprising at least one second cooling duct,
    where said first and said second cooling duct element each have a circular arc-shaped basic shape around a central axis of said cooling device,
    where said first cooling duct element and said second cooling duct element are arranged concentrically to one another,
    where said second cooling duct element is arranged with respect to said first cooling duct element in such a way relative to said central axis that said first and said second cooling duct overlie each other along said first and said second cooling duct element at least in part in the radial direction,
    wherein said first cooling duct element and said second cooling duct element are provided as a common cast part, wherein said first cooling duct and said second cooling duct each have a meander structure, where first separation gaps between meander structures of said first cooling duct of said first cooling duct element are provided rotated about said central axis of said cooling device in relation to second separation gaps between meander structures of said second cooling duct of said second cooling duct element.

2. The cooling device according to claim 1,
    wherein said circular arc-shaped basic shape of said first cooling duct element and/or said second cooling duct element extends over 360 degrees around said central axis of said cooling device or over less than 360 degrees around said central axis of said cooling device.

3. The cooling device according to claim 1,
    wherein said first cooling duct and/or said second cooling duct has a smooth inner side and/or a structured surface with serrated structures, stepped structures, columnar structures, and/or slug-shaped structures.

4. A motor housing with a cooling device according to claim 1.

5. The motor housing according to claim 4,
wherein at least one additional cooling duct is integrally formed in said motor housing.

6. A motor unit, in particular an electric motor, with a cooling device or a motor housing according to claim 1.

7. The motor unit according to claim 6,
wherein at least one further cooling structure is provided in addition to said cooling device in said motor housing.

8. The motor unit according to claim 6,
at least a first and/or a second cooling fluid can be forwarded via said cooling device in series to a further cooling structure or a parallel connection of said cooling device to said further cooling structure.

9. The cooling device according to claim 1,
wherein said circular arc-shaped basic shape of said first cooling duct element and/or said second cooling duct element extends over 270 degrees around said central axis of said cooling device or over less than 270 degrees around said central axis of said cooling device.

10. The cooling device according to claim 1,
wherein said circular arc-shaped basic shape of said first cooling duct element and/or said second cooling duct element extends over 180 degrees around said central axis of said cooling device or over less than 180 degrees around said central axis of said cooling device.

11. The cooling device according to claim 1,
wherein said circular arc-shaped basic shape of said first cooling duct element and/or said second cooling duct element extends over 135 degrees around said central axis of said cooling device or over less than 135 degrees around said central axis of said cooling device.

12. The cooling device according to claim 1,
wherein said circular arc-shaped basic shape of said first cooling duct element and/or said second cooling duct element extends over 120 degrees around said central axis of said cooling device or over less than 120 degrees around said central axis of said cooling device.

13. The cooling device according to claim 1,
wherein said circular arc-shaped basic shape of said first cooling duct element and/or said second cooling duct element extends over 90 degrees around said central axis of said cooling device or over less than 90 degrees around said central axis of said cooling device.

14. The motor unit according to claim 6,
wherein an inverter cooling is provided in addition to said cooling device in said motor housing.

15. The motor unit according to claim 6,
wherein a transmission cooling is provided in addition to said cooling device in said motor housing.

16. The motor unit according to claim 6,
wherein a coil end cooling is provided in addition to said cooling device in said motor housing.

17. The motor unit according to claim 6,
wherein a rotor hollow shaft cooling is provided in addition to said cooling device in said motor housing.

* * * * *